Figure 1:
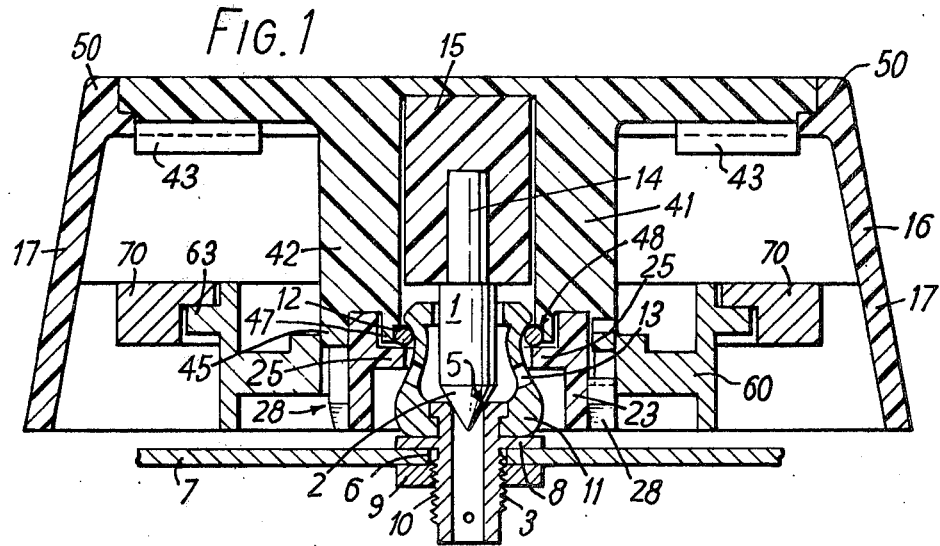

United States Patent [19]

Rossi-Ashton

[11] 4,160,462
[45] Jul. 10, 1979

[54] ADJUSTABLE RELIEF VALVES AND PRESSURE COOKERS INCORPORATING SUCH VALVES

[75] Inventor: Alan G. Rossi-Ashton, Oxted, England

[73] Assignee: The Prestige Group Limited, London, England

[21] Appl. No.: 814,978

[22] Filed: Jul. 12, 1977

[30] Foreign Application Priority Data

Jul. 19, 1976 [GB] United Kingdom ............... 30040/76

[51] Int. Cl.² .................................................. F16K 15/00
[52] U.S. Cl. .................................. 137/529; 137/534; 220/203
[58] Field of Search ...................... 137/532, 534, 529; 220/203

[56] References Cited

U.S. PATENT DOCUMENTS 2,692,613   10/1954   Waite .................................... 137/534

Primary Examiner—Robert G. Nilson
Attorney, Agent, or Firm—Diller, Ramik & Wight

[57] ABSTRACT

An adjustable relief valve comprising a valve member and a valve seating one of which acts against the other under the pressure of a predetermined weight to close a valve port, and a removable weight which can be added to the predetermined weight to vary the closing pressure, said removable weight being of annular shape and being located by means of a bayonet type connection on a boss connected to the valve member or the valve seating.

17 Claims, 9 Drawing Figures

U.S. Patent  Jul. 10, 1979  Sheet 2 of 2  4,160,462
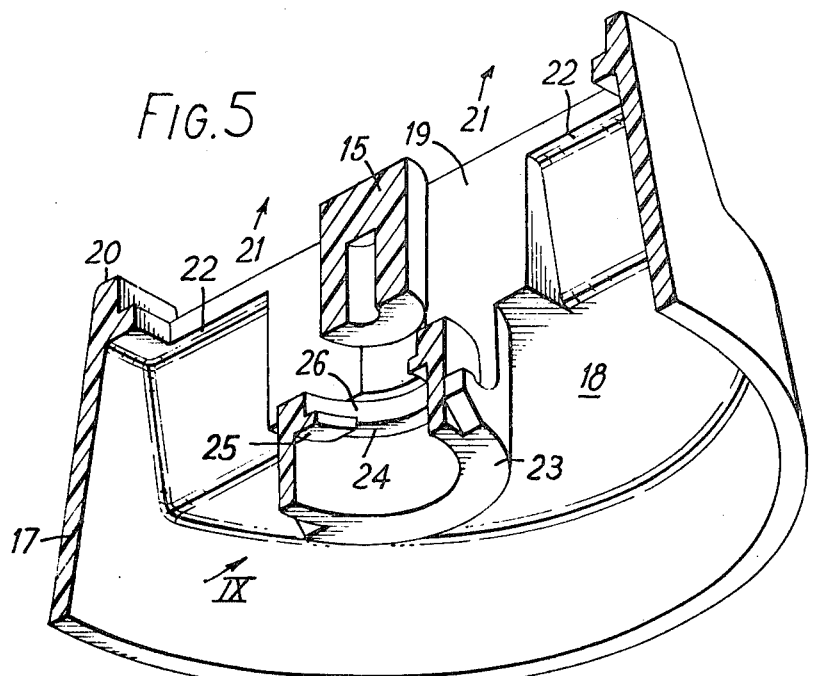
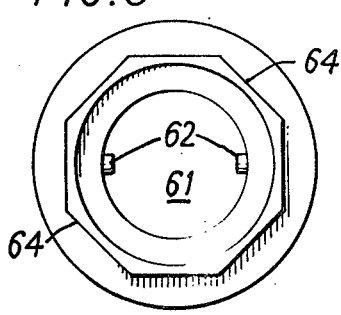
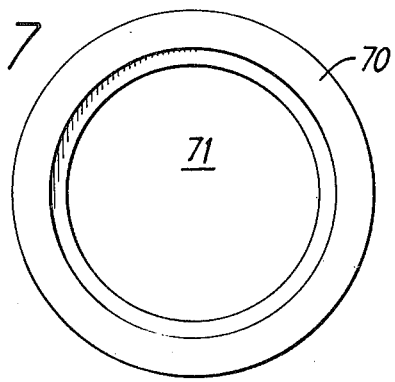
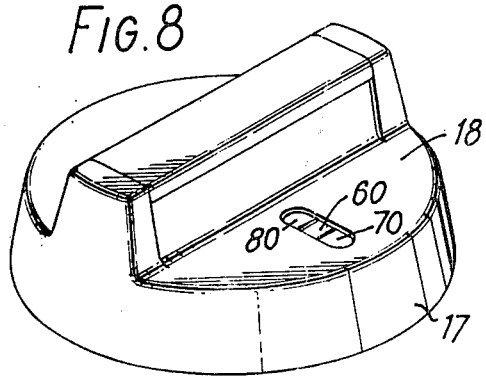
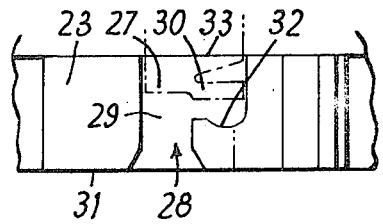

ADJUSTABLE RELIEF VALVES AND PRESSURE COOKERS INCORPORATING SUCH VALVES

This invention relates to an adjustable relief valve and to a pressure cooker incorporating such a valve.

According to the present invention an adjustable relief valve comprises a valve member and a valve seating one of which acts against the other under the pressure of a predetermined weight to close a valve port, and a removable weight which can be added to the predetermined weight to vary the closing pressure, said removable weight being of annular shape and being located by means of a bayonet type connection on a boss connected to the valve member or the valve seating.

If desired the removable weight may be arranged to hold a second removable weight in place thus making the relief valve operable at three different predetermined closing pressures. It will be appreciated that if more pressures are required further removable weights could also be provided, all the weights being held in place by the removable weight.

In one preferred construction the second removable weight is also of annular shape.

The boss may be formed with two or more L shaped slots or grooves each of which has a re-entrant portion at the inner end of the L and the removable weight is provided with two or more inwardly directed pins which are shaped to engage and located in the slots or grooves in the boss to form the bayonet connection.

Alternatively the bayonet connection may be as set forth above but with slots or grooves being provided on the weight and the pins on the boss.

Preferably means are provided to resiliently bias the pins into the re-entrant portions of the slots or grooves and thus the resiliently biased means may comprise a leaf spring formed by the wall of the slot or groove opposite each of the re-entrant portions.

In one arrangement the slots or grooves are formed on the boss and each of the leaf springs may be formed integral therewith.

In another arrangement the boss may be formed from a generally cylindrical portion in which parts of the slots or grooves are provided, and two or more fingers which extend into the cylindrical portion and form the walls of the slots or grooves opposite the re-entrant portions and which carry the leaf springs.

Preferably the boss is formed from a plastics material.

In any case, the boss may be connected to a cover which also extends over the removable weight and this cover may be provided with a handle.

The cover may also be provided with means for indicating the closing pressure of the valve, for example, by providing a window through which the weights which provide the closing pressure can be viewed.

In a convenient construction the valve member is carried by the boss, said boss being of annular configuration with the valve member in the form of a valve pin arranged co-axially within it.

The invention also includes a pressure cooker provided with an adjustable relief valve as set forth above and in which the valve member or valve seating is provided in a valve port in the wall of the cooker or a lid therefor.

Figure 2:
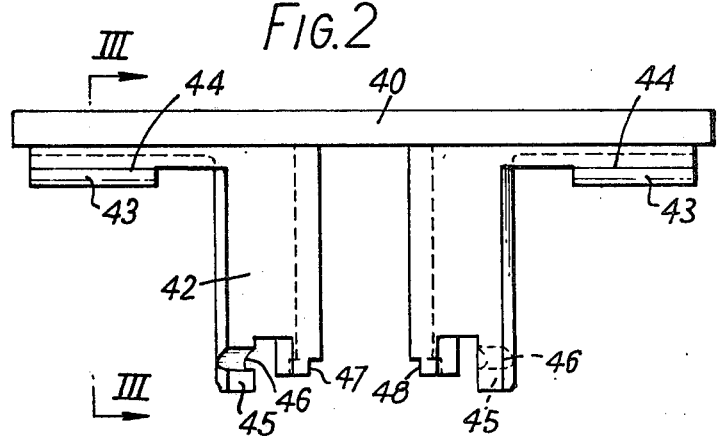
Figure 3:
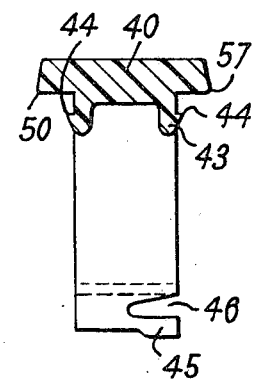

The invention may be performed in many ways but one embodiment of the relief valve for use with a pressure cooker will now be described by way of example and with reference to the accompanying drawings in which:

FIG. 1 is a cross-sectional view through a pressure relief valve according to the invention in position on the lid of a pressure cooker, FIG. 2 is a side elevation of one of the plastics material mouldings which forms part of the valve, FIG. 3 is a cross-sectional end elevation on the line III—III of FIG. 2.

Figure 4:
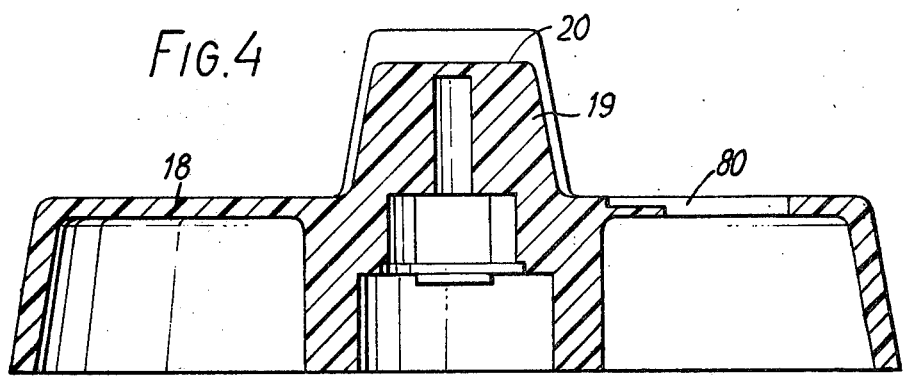

FIG. 4 is a cross-sectional side view of another of the mouldings which forms part of the valve, FIG. 5 is a cross-sectional isometrical view from below of the moulding shown in FIG. 4, FIG. 6 is a plan view of the removable weight for use in the valve, FIG. 7 is a plan view of a second removable weight for use in the valve, FIG. 8 is an isometric view from above of the valve, and FIG. 9 is a view in the direction of the arrow IX in FIG. 5.

As shown in the drawings the adjustable relief valve according to the invention comprises a valve member 1 in the form of a valve pin the lower end 2 of which is of connical shape and co-operates with a valve seating member 3 which has a bore 4 the upper end of which is provided with a chamferred surface 5 which co-operates with the lower end 2 of the valve pin. The valve seating member extends through an opening 6 in the lid 7 of a pressure cooker. A flange 8 is provided on the valve seating member and rests against the lid 7 and the member is held in position by a nut 9 which co-operates with the screw thread 10. The upper end of the valve seating member 3 is screw threaded to receive a valve connecting neck 11. This neck 11 has an upper end which is shaped to engage a retaining ring 12 to be described later and the neck is provided with gas escape openings 13.

The valve pin 1 has a shank 14 which is carried in a central portion 15 of a cover 16. This cover 16 which is most clearly shown in FIGS. 4 and 5 comprises a tapered cylindrical skirt 17 the upper end of which is closed by two segments 18 from which an upwardly extending ridge 19 projects. This ridge 19 extends across the full width of the upper part of the cover and is hollow apart from the central portion 15 in which the valve pin 1 is carried. The upper horizontally extending portion 20 is pierced to form two slots 21 each of which extends part way along the length of the ridge. At each inner corner of the ridge the material is cut back to provide a re-entrant surface 22. Arranged in the lower part of the cover is a hollow cylindrical boss 23. The inner walls of the boss are stepped at 24 to provide an inwardly projecting surface and two inwardly projecting lugs 25 on the level of the surface 24 extend radially inwardly beyond the surfaces in a periphery. A small ring shaped notch 26 is provided immediately beneath the lugs 25 and extending around the edge of the surface 24. This notch 26 is intended to house the retaining ring 12 in a manner to be described.

As is most clearly shown in FIG. 9 opposite sides of the boss 23 are formed with L shaped grooves 27. Each of these grooves comprises a tapered entrance portion 28, a substantially straight portion 29 from which extends an arm portion 30. The edge of the arm portion 30 adjacent the lower end 31 of the boss has a re-entrant portion 32. The upper end 33 of the groove is open because this end of the groove opens into the hollow interior of the ridge 19.

The other part of the cover is shown in FIGS. 2 and 3. This comprises an upper bar like member 40 carrying two downwardly projecting fingers 41, 42. The bar 40 also carries at each end downwardly projecting rails 43 which have projecting engagement ridges 44.

Each of the fingers 41, 42 is of curved shape in cross-section and at each lower end a leaf spring 45 is formed by a cut-out 46. Both parts of the cover are made from a resilient plastics material and thus the leaf spring 45 can bend resiliently into the cut-out 46 if required. The cut-outs are arranged from opposite sides as is most clearly shown in FIG. 2. The lower parts of the fingers 41, 42 also carry projecting abutments 47, 48.

The two parts of the cover are appropriately dimensioned so that the fingers 41, 42 can be pushed into the lower part of the cover and closely surround the centre portion 15. The fingers are pushed inwards until the abutments 47, 48 engage the projecting lugs 25. The ends of the fingers 42, 41 carrying the leaf springs 45 have now entered the open ends 33 of the slots 27 in the boss 23 and they thus close the ends of the grooves as indicated by broken lines in FIG. 9. The grooves 29 are therefore now closed L-shaped slots in each side of the boss 23, the tapered portions 28 of the slots opening downwardly.

As the fingers 42, 41 enter the grooves 29 in the boss the downwardly projecting rails 43 engage the edges of the openings 21 in the ridge on the cover. The sides of the openings are cut down so that the ends thereof project upwardly as is most clearly shown at 50 in FIG. 1. Further movement of the bar 40 now causes the rails 43 to resiliently move inwardly until the flanges 44 pass beyond the edges of the slots which thus allows the rails 43 to spring outwardly and thus clamp the parts together the flanges 44 preventing withdrawal. As will be seen from FIG. 8 the upper surface of the rail 40 is now aligned with the corners 50 of the ridge and the edges 51 of the rail 40 project outwardly beyond the edges of the ridge 19 this ridge thus producing a handle and the projecting edge providing a grip.

With the cover thus assembled a metal retaining ring 12 is pressed past the lugs 25 and into the ring shaped notch 26. This retaining ring 12 co-operates with the upper end of the neck 11 which is appropriately shaped so that when the valve pin 1 is pushed into the neck 11 the upper end of this member which is appropriately shaped springs the ring open and enters the space between the ring and the centre portion 15 of the cover, that is in the position shown in FIG. 1. There is sufficient movement to allow the valve pin 1 to lift from the valve seating member 3 to allow the escape of gas but the retaining ring prevents the cover being blown off or from falling off if the lid is inverted. If it is necessary to completely remove the cover it is merely necessary to pull it hard enough to allow the ring to expand and thus release over the upper end of the neck 11.

The cover and pin themselves are of a predetermined weight so that when the cover is in position the valve will blow open if that pressure is achieved. If it is desired to make the pressure heavier a removable weight 60 is employed. This comprises an annular member of appropriate weight which has an inner bore 61 into which project two diametrically opposed pins 62. One side of the weight has an outwardly projecting flange 63 and the other side is formed with flats 64 to enable the weight to be manipulated.

When it is desired to place the weight in position the valve cover and valve pin 1 are removed from the valve seating member 3 and the removable weight is placed in position on the boss 23 by passing the pins 62 into the tapered open ends 28 of the grooves 29. Upward movement of the weight moves the pins to the end of the groove and a twisting movement then moves the pins into the other arm of the L shaped slot. The pins are then biassed into the re-entrant portions 32 by the action of the leaf springs 30 and due to leaf springs 30 holding the pins in this position they are prevented from shaking out. It will be appreciated that when the pins are pushed into the position the leaf springs 30 bend into the cut outs 26 and then spring back to hold the pins in position.

If it is desired to further increase the weight on the pin 21 and thus increase the pressure available in the pressure cooker a further removable weight 70 can also be carried. This weight 70 comprises a ring which has a bore 71 which is stepped 72. When it is desired to fix the ring in position it is merely necessary to remove the first removable weight by twisting it and withdrawing it from the boss. The second weight 70 is then placed in position and the first removable weight 60 replaced. The flange 63 on this weight engages the steps 72 in the second weight 70 and thus holds it in position as shown in FIG. 1.

One of the segments 18 on the cover is provided with a cut out 80 which acts as a window. When the weights 60 and 70 are in position they can be viewed through the window so that the weight of the valve can be instantly identified. If desired the two removable weights could be different colours in order to assist identification.

The weights, valve pin and retainer ring 12 can be made from any suitable metal whilst the cover portions are made from a resilient plastics material.

What we claim is:

1. An adjustable relief valve comprising a valve member and a valve seating member, said valve member and valve seating member being operative under the weight of one of said members to close a valve port of said valve seating under a predetermined force, a weight adapted to be removably secured to one of said members to increase the relative closing force of said members beyond said predetermined force, said removable weight being of an annular configuration, bayonet connection means between said removable weight and one of said members for removably securing the same to each other, said bayonet connection means including at least two L-shaped slots carried by one of said members and weight removably interlockable with at least two pins carried by the other of said one member and weight, and each L-shaped slot having an entrance portion and a re-entrant portion remote therefrom whereby said pins are introduced into said slots through said entrance portions and seat within said re-entrant portions to retain said weight and one member in secured relationship.

2. The adjustable relief valve as defined in claim 1 including a second removable weight to further increase the relative closing force of said members, and means for removably securing said first-mentioned and second weights to each other.

3. The adjustable relief valve as defined in claim 1 including a second removable weight to further increase the relative closing force of said members, said second weight being of an annular configuration, and means for removably securing said first-mentioned and second weights to each other.

4. The adjustable relief valve as defined in claim 1 wherein one of said members includes a boss, said boss carries said L-shaped slots, said pins are inwardly directed, and said pins are carried by one of said weight and other member.

5. The adjustable relief valve as defined in claim 1 wherein one of said members includes a boss, said boss carries said L-shaped slots, said pins are inwardly direct, said pins are carried by one of said weight and other member, and means for resiliently biasing said pins into said re-entrant portions of said L-shaped slots.

6. The adjustable relief valve as defined in claim 1 including means for resiliently biasing said pins into said re-entrant portions of said L-shaped slots.

7. The adjustable relief valve as defined in claim 1 including means for resiliently biasing said pins into said re-entrant portions of said L-shaped slots, and said biasing means being defined by resilient walls in part defining said re-entrant portions.

8. The adjustable relief valve as defined in claim 1 wherein said one member includes a boss carrying said L-shaped slots, said pins are carried by said weight, and means for resiliently biasing said pins into said re-entrant portions of said L-shaped slots.

9. The adjustable relief valve as defined in claim 1 wherein said one member includes a boss carrying said L-shaped slots, said pins are carried by said weight, means for resiliently biasing said pins into said re-entrant portions of said L-shaped slots, a cover, means securing said boss to said cover, and said cover extends over said weight.

10. The adjustable relief valve as defined in claim 1 wherein said one member includes a boss carrying said L-shaped slots, said pins are carried by said weight, means for resiliently biasing said pins into said re-entrant portions of said L-shaped slots, a cover, means securing said boss to said cover, said cover extends over said weight, and said cover including means for indicating the closing pressure of said relief valve.

11. The adjustable relief valve defined in claim 1 wherein said one member includes a boss carrying said L-shaped slots, said pins are carried by said weight, means for resiliently biasing said pins into said re-entrant portions of said L-shaped slots, a cover, means securing said boss to said cover, said cover extends over said weight, said cover including means for indicating the closing pressure of said relief valve, and said indicating means being a window in said cover through which can be viewed.

12. The adjustable relief valve defined in claim 1 including a second removable annular weight to further increase the relative closing force of said members, said weights being in concentric relationship to each other, means for removably securing said first-mentioned and second weights to each other, and said last-mentioned means being defined by annular axially abutting wall portions of said weights.

13. The adjustable relief valve as defined in claim 1 wherein said pins enter said L-shape slots by movement therein from a first direction, means for resiliently biasing said pins into said re-entrant portions of said L-shaped slots, and said biasing means being positioned in said L-shaped slots by movement therein from a second direction opposite to said first direction.

14. The adjustable relief valve as defined in claim 1 wherein said pins enter said L-shape slots by movement therein from a first direction, means for resiliently biasing said pins into said re-entrant portions of said L-shaped slots by movement therein from a second direction opposite to said first direction, said biasing means being a pair of resilient fingers carried by said one member with one finger being disposed in an associated L-shaped slot.

15. The adjustable relief valve as defined in claim 1 wherein said L-shaped slots are carreid by said valve member and said pins are carried by said weight, said valve member includes a pair of fingers, and each finger includes means for resiliently biasing said pins into said re-entrant portions of said L-shaped slots.

16. The adjustable relief valve as defined in claim 15 wherein said biasing means and pins enter said L-shaped slots from generally opposite directions.

17. The adjustable relief valve as defined in claim 16 wherein said biasing means and pins enter said L-shaped slots from generally opposite directions.

* * * * *